Aug. 20, 1929.   G. E. HEYL   1,725,454
MANUFACTURE OF NONSPLINTERING GLASS SHEETS
Filed Sept. 18, 1928   2 Sheets-Sheet 1
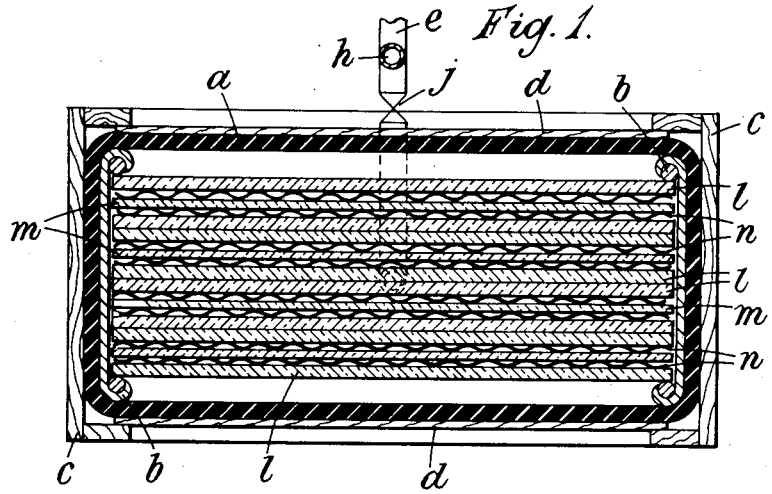
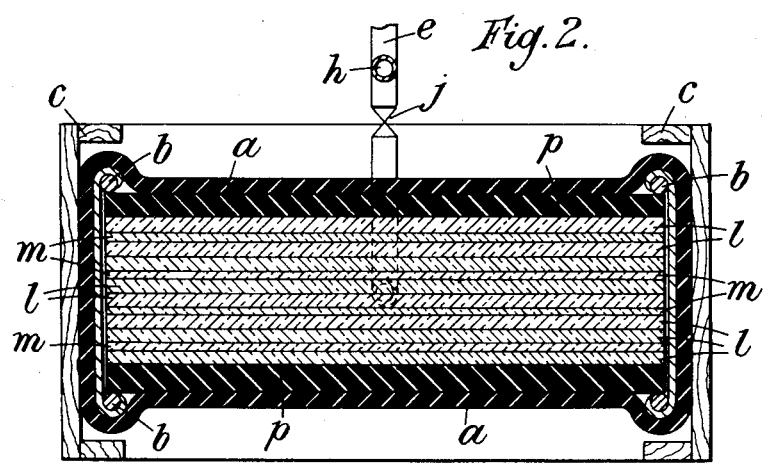
Inventor.
George Edward Heyl
BY Reegs, Bayer & Bakelar
ATTORNEYS Aug. 20, 1929.  G. E. HEYL  1,725,454
MANUFACTURE OF NONSPLINTERING GLASS SHEETS
Filed Sept. 18, 1928   2 Sheets-Sheet 2

Inventor.
George Edward Heyl
BY Reeves, Boyer & Bakelar
ATTORNEYS.

Patented Aug. 20, 1929.

1,725,454

UNITED STATES PATENT OFFICE.

GEORGE EDWARD HEYL, OF WESTMINSTER, LONDON, ENGLAND.

MANUFACTURE OF NONSPLINTERING GLASS SHEETS.

Application filed September 18, 1928, Serial No. 306,751, and in Great Britain August 29, 1928.

This invention is an improvement in or modification of the process of manufacturing nonsplintering glass sheets described and claimed in the specification of my copending application for Patent No. 306,750.

In the said specification is described a process of manufacturing compound interadherent sheets of glass and cellulose derivative composition, such as cellulose acetate, in which the glass and cellulose derivative composition sheets, formed with adherent films on the cellulose derivative composition by moistening with a solvent or softening liquid, are heated and subjected to direct pressing by a fluid under pressure whilst shielded from contact therewith by being enclosed in a pliable bag.

Now when a number of compound sheets are to be pressed simultaneously in the same bag it is difficult to insert them separately therein after the surfaces of the cellulose derivative composition sheets have been moistened with and rendered soft by the solvent or softening liquid. Moreover, and what is a greater disadvantage, such separately inserted moistened sheets cannot be freed from bubbles of air which become trapped between the sheets and impair the finished product.

Now according to the present invention, the bag, enclosed in which the sheets are subsequently subjected to direct fluid pressing, is itself utilized as the vessel in which the sheets are immersed in the solvent or softening liquid, and such immersion is effected with the sheets standing on edge, and, in addition, suction is initially applied to the top of the bag after closure, whereby the external atmospheric pressure expresses the excess of such liquid upwards from the sheets in the bag, prior to the bag and the sheets therein being subjected to conjoint direct fluid pressing and heating.

The bag is held distended by a rigid channelled frame in which the glass and cellulose derivative composition sheets are inserted and held on edge. The cellulose derivative composition sheets in the frame are initially separated by spacing members from the glass sheets therein. These spacing members are removed prior to the application of suction and pressing.

To minimize entanglement of bubbles of air between the sheets, the sheets are preferably inserted in the frame and bag prior to liquid being introduced therein, and introduction of the liquid preferably takes place at the bottom of the bag, so that its level ascends therein. To avoid residual air in the closed bag being drawn in between the sheets on the liquid being pressed out by the external atmospheric pressure on collapse of the sides of the bag under suction, the suction is, at any rate initially, applied to the top of the bag.

The manner in which the invention is carried into effect is described in more detail with the aid of the accompanying drawings, in which:—

Fig. 1 is a sectional plan of the bag and its appurtenances with the sheets contained therein and prior to the removal of the spacing members.

Fig. 2 is a sectional plan similar to Fig. 1 but with the spacing members removed and the sides of the bag collapsed under external atmospheric pressure.

On a smaller scale:—

Figure 3:
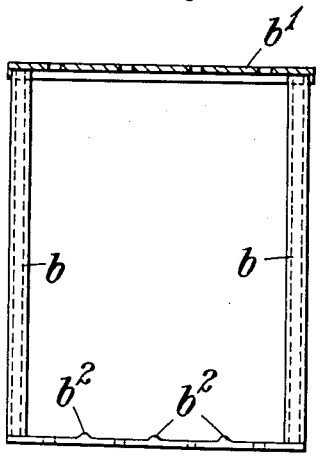

Fig. 3 is an elevation and

Figure 4:
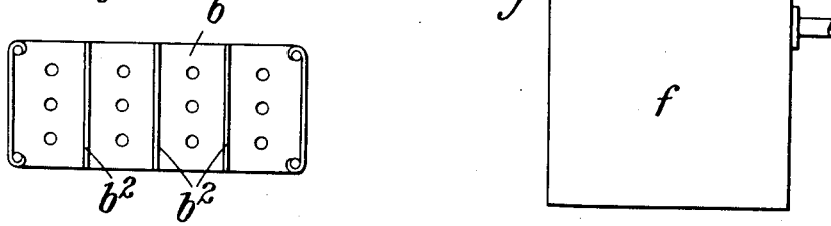

Fig. 4 a plan of the bag-distending channelled frame.

Figure 5:
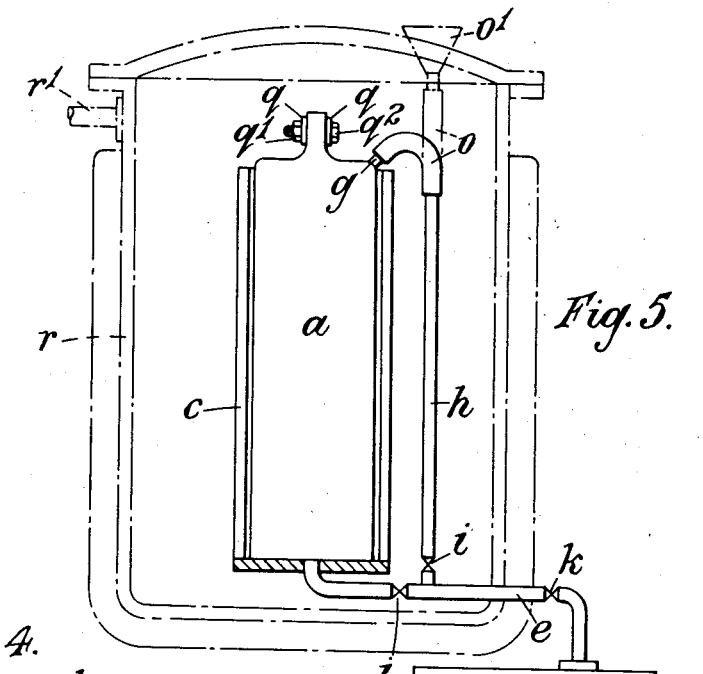

Fig. 5 is an elevation of the bag in position in a steam pan or autoclave, the latter being shown in section by dot-dash lines.

$a$ is the india rubber bag. This bag $a$ is held distended by an open sided channelled frame $b$, shown separately in Figs. 3 and 4.

The distended bag $a$ is held in an open sided wooden crate $c$, the open sides of which are temporarily closed by slidingly inserted boards $d$.

A pipe $e$ connects the bottom of the bag $a$ to a tank $f$ and the top of the bag $a$ has a pipe nipple $g$.

As shown in Fig. 5, an upright pipe $h$ is connected to the pipe $e$ and is provided with a cut-off cock $i$, and the pipe $e$ is provided with cut-off cocks $j$ and $k$, one on each side of its connection to the upright pipe $h$.

$l$ are sheets of glass inserted in the distending frame $b$ within the bag $a$, the mouth of which is initially open. $m$ are sheets of cellulose derivative composition inserted between each alternate pair of glass sheets $l$ and separated therefrom by corrugated perforated zinc or vulcanite spacers $n$.

As the product to be made is a plurality of compound sheets each composed of two sheets of glass with an interadherent interposed sheet of cellulose derivative composition, there are obviously double the number of sheets of glass than sheets of cellulose derivative composition.

After the sheets $l$ and $m$ and spacers $n$ have been inserted in the frame $b$ and bag $a$, and whilst the mouth of the bag is still open, softening or solvent solution is poured into the pipe $h$, for instance with the aid of a funnel $o^1$ inserted in a short rubber hose pipe $o$ on the pipe $h$, Fig. 5, the cocks $i$ and $j$ being open and the cock $k$ closed.

The liquid poured into the pipe $h$ descends such pipe and passing along the available portion of the pipe $e$, ascends gradually within the bag $a$ and, when sufficient liquid has been poured down the pipe $h$, eventually submerges the sheets $l$ and $m$.

Pouring of the liquid is then ceased and the spacers $n$ are withdrawn from between the sheets.

After removal of the spacers $n$ the sheets $l$ and $m$ are then pushed together by hand, and the resulting free space within the frame $b$ on each side of the pack of sheets $l$, $m$, is approximately filled out by inserting rubber mats $p$, shown in Fig. 2. A top plate or cover $b^1$, shown in section in Fig. 3, is then placed over and closes the previously open top of the frame $b$.

The mouth of the bag $a$ is then closed and is clamped hermetically closed by clamping bars $q$ drawn together by nuts $q^1$ and bolts $q^2$, as shown in Fig. 5.

After the mouth of the bag $a$ has been hermetically closed, the rubber hose pipe $o$ on the pipe $h$ is bent over and fitted on to the before mentioned pipe nipple $g$ at the top of the bag $a$.

With the cock $j$ of the pipe $e$ closed and the cocks $i$ and $k$ open, the tank $f$ is by a pipe $f^1$ placed in communication with a suction air pump maintaining a vacuum of about 26 inches of mercury.

Suction thus is applied to the top of the bag $a$, and on the sides of the bag collapsing inwards, as indicated in Fig. 2, under the external atmospheric pressure, air contained in the bag $a$, which air is obviously above the liquid therein, is the first to be forced out. Thus any liability of the air being drawn down between the sheets is avoided.

On complete collapse of the sides of the bag and consequently after all air and the major portion of the liquid has been drawn off from the bag, the cock $j$ is again opened. This permits residual liquid gradually to drain out of the bag under the squeeze exerted by the atmospheric pressure. It is immaterial whether the cock $i$ is then still open or is closed.

On collapse of the sides of the bag $a$, the boards $d$, or one thereof, is withdrawn from the crate $c$, thus leaving the bag $a$ freely exposed to external pressure at the open side or sides of the crate $c$.

Whilst the suction is still maintained on the interior of the bag $a$, and after about 30 minutes has been allowed to elapse during which the sheets and bag are draining, external steam pressure is applied to the bag $a$ and the pack of sheets therein, by admitting steam under pressure by a pipe $r^1$ to the interior of a then closed autoclave $r$ in which the crate $c$ is mounted.

The bag $a$ is subjected to the steam for about 15 minutes, the steam pressure gradually being brought up to 35 pounds per square inch above atmospheric pressure during the first 7½ minutes and maintained at this pressure for the remainder of this period.

The pairs of sheets of glass $l$ with a sheet of cellulose derivative composition $m$ interposed, are each formed into a thoroughly interadherent compound sheet by the pressure and heat of the steam, and can be immediately removed from the bag.

The upper surface of the base of the channelled frame $b$ is provided with transverse ridges $b^2$ to reduce the frictional resistance imposed on the bottom edges of the sheets $l$ and $m$, in closing together under the atmospheric and steam pressures.

Claims:

1. A method of avoiding the trapping of air bubbles between the component sheets of a plurality of compound sheets of glass and cellulose derivative composition conjointly pressed in a fluid-tight bag, consisting in immersing said sheets on edge in liquid within said bag, closing said bag, and applying suction initially to the top of said bag prior to subjecting said bag and sheets to said conjoint pressing.

2. A method of avoiding the trapping of air bubbles between the component sheets of a plurality of compound sheets of glass and cellulose derivative composition conjointly pressed in a fluid-tight bag, consisting in arranging said sheets on edge within said bag, admitting liquid at the bottom of said bag to rise and submerge said sheets, closing said bag, and applying suction initially to the top of said bag prior to subjecting said bag and sheets to said conjoint pressing.

3. An apparatus for moistening and draining a plurality of sheets of glass and cellulose derivative composition, consisting of a fluid-tight bag, pipe connections at the top and bottom of said bag, an upright channelled frame within and distending said bag and in which said sheets are arranged on edge, and a crate containing said bag.

In testimony whereof I have signed my name to this specification.

GEORGE EDWARD HEYL.